(12) United States Patent
Erhan et al.

(10) Patent No.: US 6,528,571 B1
(45) Date of Patent: Mar. 4, 2003

(54) EXTRUSION FREEFORM FABRICATION OF SOYBEAN OIL-BASED COMPOSITES BY DIRECT DEPOSITION

(75) Inventors: Sevim Z. Erhan, Peoria, IL (US); Zengshe Liu, Peoria, IL (US); Paul D. Calvert, Tucson, AZ (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 253 days.

(21) Appl. No.: 09/721,300

(22) Filed: Nov. 22, 2000

(51) Int. Cl.$^7$ .................................................. C08K 3/34
(52) U.S. Cl. ....................... 524/494; 524/109; 524/252; 524/492
(58) Field of Search ................................ 524/109, 252, 524/492, 494

(56) References Cited

U.S. PATENT DOCUMENTS

| | | |
|---|---|---|
| 5,906,863 A | 5/1999 | Lombardi et al. |
| 5,932,290 A | 8/1999 | Lombardi et al. |
| 6,013,714 A | 1/2000 | Haruta et al. |

OTHER PUBLICATIONS

R.P. Wool, "Department of affordable soy–based plastics, resins, and adhesives", CHEMTECH, Jun. (1999), pp. 44–49.

P. Calvert et al., "Chemical Solid Free–Form Fabrication: Making Shapes without Molds", Chem Mater., vol. 9, No. 3 (1997), pp. 650–663.

R.P. Wool, "ACRES (Affordable Composites from Renewable Sources)", University of Delaware, Center for Composite Materials, *Composite TechBrief*, No. 111.

*Primary Examiner*—Edward J. Cain
(74) *Attorney, Agent, or Firm*—M. Howard Silverstein; Curtis P. Ribando; John D. Fado

(57) ABSTRACT

Composite formulations useful in the production of objects by the solid freeform fabrication method comprise (A) an epoxidized drying oil (primary resin); (B) a curing agent; (C) a fibrous filler; (D) a thixotropic agent and optionally (E) a secondary resin. These composites are characterized by unique physical properties including enhanced biodegradability.

23 Claims, 3 Drawing Sheets

EXTRUSION FREEFORM FABRICATION OF SOYBEAN OIL-BASED COMPOSITES BY DIRECT DEPOSITION

BACKGROUND OF THE INVENTION

1. Field of the Invention

This invention relates to soybean oil-based composite formulations useful in the production of three-dimensional objects by the solid freeform fabrication method.

2. Description of the Prior Art

Solid freeform fabrication (SFF) is a method of, making shapes without molds. It is best known in its stereolithography forms as a method of rapid prototyping (U.S. Pat. No. 4,575,330). In stereolithography, a laser photopolymerizes successive thin layers of monomer to build up a solid object. Extrusion solid freeform fabrication (ESFF) was developed by the University of Arizona in collaboration with Advanced Ceramic Research (Tucson, Ariz.) as reported by K. Stuffle et al., ["Solid Freebody Forming from Polymerizable Slurry", *Solid Freeform Fabrication Symposium Proceeding*, University of Texas, Austin, 60, (1993)]. The apparatus for implementing ESFF functions essentially as a three-dimensional (3D) pen plotter, wherein a slurry is extruded by a stepper motor depressing a syringe plunger and forcing the material through a needle. By moving the syringe over a computer-controlled path along each of the x, y and z axes, it is possible to create nearly any geometric figure [P. Calvert et al., "Chemical Solid Free-Form Fabrication: Making Shapes without Molds", *Chem. Mater.*, 9, 650, (1997)]. This method has the potential to produce geometrically complex composites that could not be made in any other way. Lombardi et al., (U.S. Pat. Nos. 5,906,863 and 5,932,290, both herein incorporated by reference) teach methods for the preparation of three-dimensional bodies by geometrically controlled deposition of layers of a liquid composition through a nozzle and onto a base. The composition comprises thermally-polymerizable components that polymerize upon heating.

Concerns for the stability of future petroleum supplies have stimulated much attention in the past few decades to feedstocks for polymers based on renewable resources [L. E. St. Peirre et al., *Future Sources of Organic Materials*, Pergamon, N.Y., (1980); I. S. Goldstein, *Science*, 817, 189 (1975); D. Swern, ed., *Bailey's Industrial Oil and Fat Products*, Wiley, N.Y. (1979)]. The importance of natural products for industrial applications has recently become even more apparent as a result of increased social emphasis on the issues of the environment, waste disposal and depletion of non-renewable resources. United States agriculture produces over 12 billion pounds of soybean oil annually; and frequently in excess of one billion pounds remains unutilized. Development of economically feasible new industrial products from soybean oil, and commercial processes utilizing soybean oil, is highly desirable. Soy-based polymers could support global sustainability and provide an alternative to synthetic polymers for many manufacturing applications [R. P. Wool, "Development of Affordable Soy-based Plastics, Resins, and Adhesives", *Chemtech*, 29: 44 (1999)].

Soybean oil is a double bond-containing triglyceride. These double bonds may be converted into the more reactive oxirane moiety by reaction with peracids or peroxides. In the past, epoxidized soybean oil (ESO), has mainly been used as plasticizer for PVC compounds, chlorinated rubber and PVA emulsions. Epoxy-containing soybean oil used as raw materials for the synthesis of new polymers suitable for liquid molding processes have been reported by Wool and coworkers [R. P. Wool et al., *Polym. Prepr.*, (Am. Chem. Soc., Div. Polym. Chem.) 39:90 (1998); R. P. Wool et al., "Affordable Composites from Renewable Sources (ACRES)", 216th ACS National Meeting, Boston, Aug. 23–27, 1998]. The structural strength of ESO-based composites can be enhanced by inclusion of mineral fillers and fibers that are now extensively used in the plastics industry to achieve desired properties or to reduce the price of the finished articles. Thus, it is relatively easy to formulate these composites to meet most commercial demands. In contrast to typical petroleum-based composite matrix resins such as vinyl esters, polyesters and epoxies, soy-based composites are optionally biodegradable; as plant oils, they contain functional groups that are readily attacked by lipase-secreting bacteria.

SUMMARY

We have now discovered a series of epoxidized drying oil-based composite formulations useful in the production of objects by the solid freeform fabrication method. These formulations comprise (A) an epoxidized oil (primary resin); (B) a curing agent; (C) a fibrous filler; (D) a thixotropic agent and optionally (E) a secondary resin.

In accordance with this discovery, it is an object of this invention to provide a novel class of composites that can be shaped by the solid freeform fabrication method.

It is also an object of the invention to produce composites having a unique combination of properties meeting the demands of specific commercial applications.

Another object of the invention is to introduce a new use for vegetable oil and to expand the market for an agricultural commodity.

A further object of the invention is to produce composites that reduce the demand on petroleum resources and that are biodegradable.

These and other objects and advantages of the invention will become readily apparent from the ensuing description.

DETAILED DESCRIPTION OF THE INVENTION

Epoxidized Oil Component A (Primary Resin)

Figure 1:
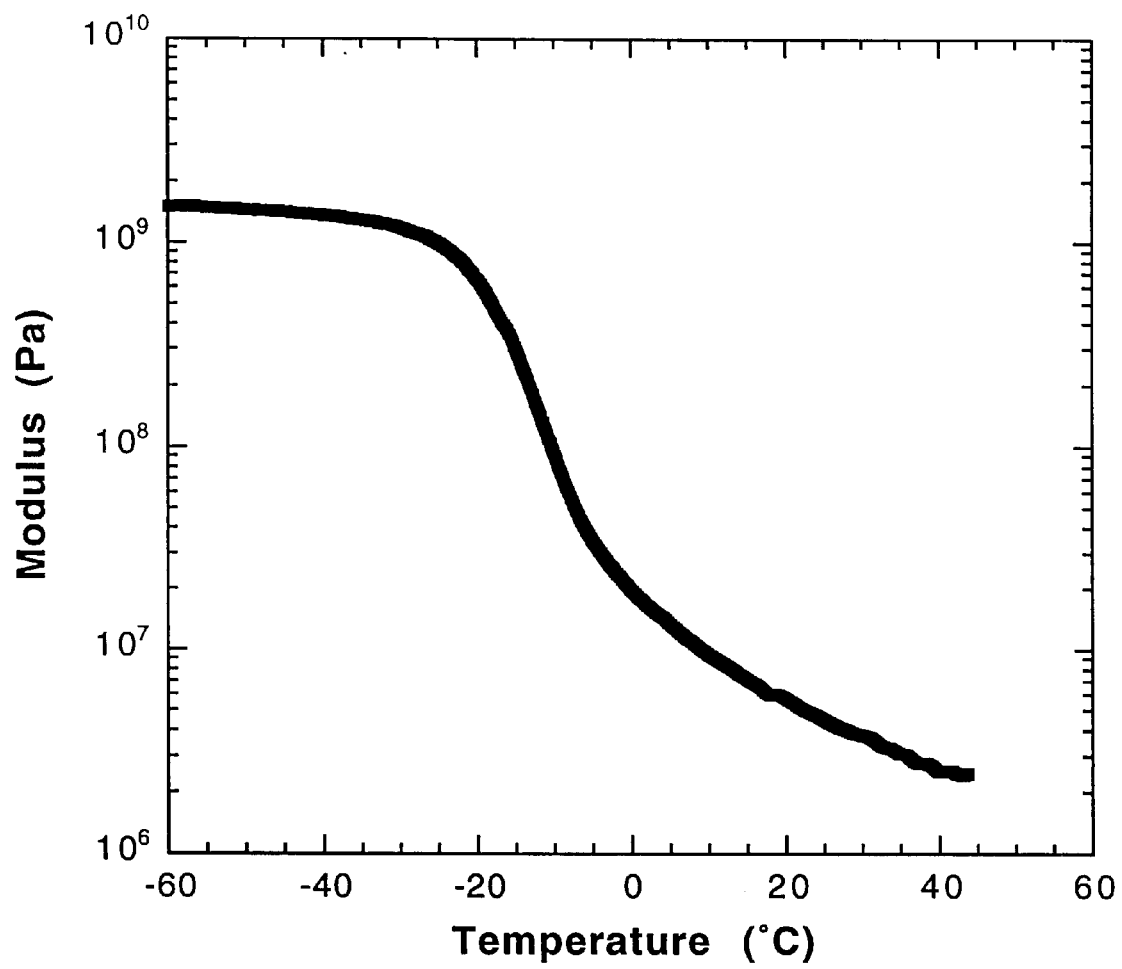
FIG. 1 is a graph showing a typical curve of flexural modulus as a function of temperature for an E-glass filled composite of the invention.

The oils contemplated herein as the source of the epoxidized oil (A) include what are normally referred to as the drying oils. The drying oils include plant, animal, synthetic and semi-synthetic glycerides, particularly triglycerides, that can be transformed into hard, resinous materials [see *Encyclopedia of Polymer Science and Technology*, H. F. Monk et al., eds., John Wiley & Sons, (1966), pp. 216–234]. The expression "drying oils" is generic to both true drying oils, which dry (harden) at normal atmospheric conditions, and semidrying oils, which must be baked at elevated temperatures in order to harden. Unless otherwise indicated, "drying oil" will be used herein in its broadest sense to refer to both types of drying oil. The unsaturated fatty acids of a drying or semidrying oil comprise double bonds that are readily available for entering into an oxidative reaction, or other reactions involved in the drying process. Common sources of drying oils include castor oil, linseed oil, oiticica oil, safflower oil, soybean oil, sunflower oil, corn oil, tung oil, and fish oil. Of particular interest are the vegetable oils that contain the higher levels of polyunsaturated fatty acids, such as soybean oil, linseed oil and safflower oil. Of these oils, soybean oil is most readily available in both its unmodified and epoxidized state, and is therefore the most preferred. The properties of the composite formulation and of the cured composite can be tailored by blending together different drying oils.

The drying oil is first either partially or completely epoxidized. The resultant oxirane rings are then available for cross-linking. Epoxidation may be carried out as described by Qureshi et al., [*Polymer Science and Technology,* Vol. 17, Plenum Press, p. 250] or by any other method as known in the art. The degree of epoxidation should be such that there are at least 2, and preferably at least 3, oxirane rings per triglyceride molecule. Typically, epoxidized soybean oil would have 3–7 oxirane rings per molecule.

Curing Agent Component B

The curing agent (B) for use herein, is a polyamine having two or more primary amino groups. These amino groups may be positioned on either primary or secondary carbons. One exemplary category of curing agents useful herein are the polyether polyamines, such as: 2,2'-(ethylenedioxy)-bisethylamine; polyoxypropylene diamine; and polyoxypropylene triamine. Another exemplary category of curing agents are the aliphatic polyamines, such as diethylenetriamine (DTA) and triethylenete-tramine (TTA). Other amines, such as other polyalkyleneamines, polyethylenimines and cyclic amines (e.g. diaminodiphenyl methane) would be readily apparent to a person of ordinary skill in the art. The degree of cross-linking, and thus the physical properties of the resultant composites, are in large part a function of the reactivity of the curing agent. In general, the higher the amine functionality the more reactive the curing agent. Curing agents having the amine groups on primary carbon atoms are more reactive than those amine groups located in another position on the molecule, for example, on secondary carbon atoms. Also, primary amines are more reactive than secondary amines. In illustration, Tables 2 and 8 compare tensile properties for composite formulations produced with a variety of curing agents as described in Examples 2 and 8, respectively. When polyoxypropylenetriamine (a trifunctional primary amine having its amine groups located on secondary carbon atoms at the ends of aliphatic polyether chains) is used as the curing agent, the resultant composite has higher tensile values than when polyoxypropylene diamine (a bifunctional amine also having the amine groups located on secondary carbons) is used. Moreover, triethyleneglycoldiamine (having unhindered amine groups located on primary carbon atoms at the ends of an aliphatic polyether chain) is more reactive than triethyleneglycoldiamine. Reactivity is further enhanced with aliphatic polyamines having both primary and secondary amines available for cross-linking. Tables 2 and 8 indicate that DTA (having two primary and one secondary amine) and TTA (having two primary and two secondary amines) yield composites having improved physical properties over those prepared with aforementioned curing agents having only primary amine. The secondary amine groups also take part in cross-linking reaction and formulate a network structure of polymer matrix, thereby enhancing the mechanical properties of resultant composites. The properties of the composite formulation and of the cured composite can be further tailored by use of a mixture of polyamine curing agents.

The amount of curing agent relative to the epoxidized oil, or to the epoxidized oil/secondary resin, will typically be sufficient to achieve stoichiometric cross-linking of all available oxirane rings. It is unnecessary to react all oxirane rings, provided that the minimum degree of cross-linking (described above) is achieved.

Fibrous Filler Component C

The fibrous filler (fiber) component (C) may be. any mineral or organic fiber that will serve the function to increase the viscosity and stiffness of the formulation as it is being ejected from the head of the ESFF apparatus and to also add the strength of the cured composite. In general, the fibers should be as long as possible in order to maximize the strength imparted to the composite. However, care must be taken in selecting fibers that are sized to permit smooth flow of the composite formulation through the orifice of the freeform writing apparatus. Appropriately-sized fibers could be readily determined by a person of ordinary skill in the art.

Without limitation thereto, the fibers may be whiskers of glass, carbon, silica, silicon carbide, boron carbide, tungsten carbide, zirconia, surface modified wollastonite, calcium sulfate dihydrate (gypsum), aramid and the like, as well as mixtures thereof. Also, natural organic fibers such as from textiles, wood, wood pulp, bagasse or other agricultural residues may be used, provided that they are first dried to a point that their moisture contents will not interfere with the curing process. Objects produced with organic fibers will tend to be more susceptible to absorption of ambient moisture, and will also tend to be more completely biodegradable than shaped objects using mineral fibers. The aforementioned fibers may be used alone or in combination with one another. As clearly demonstrated in Table 14 below, unexpectedly high moduli of the composites are obtained by combining two types of fiber.

Figure 2:
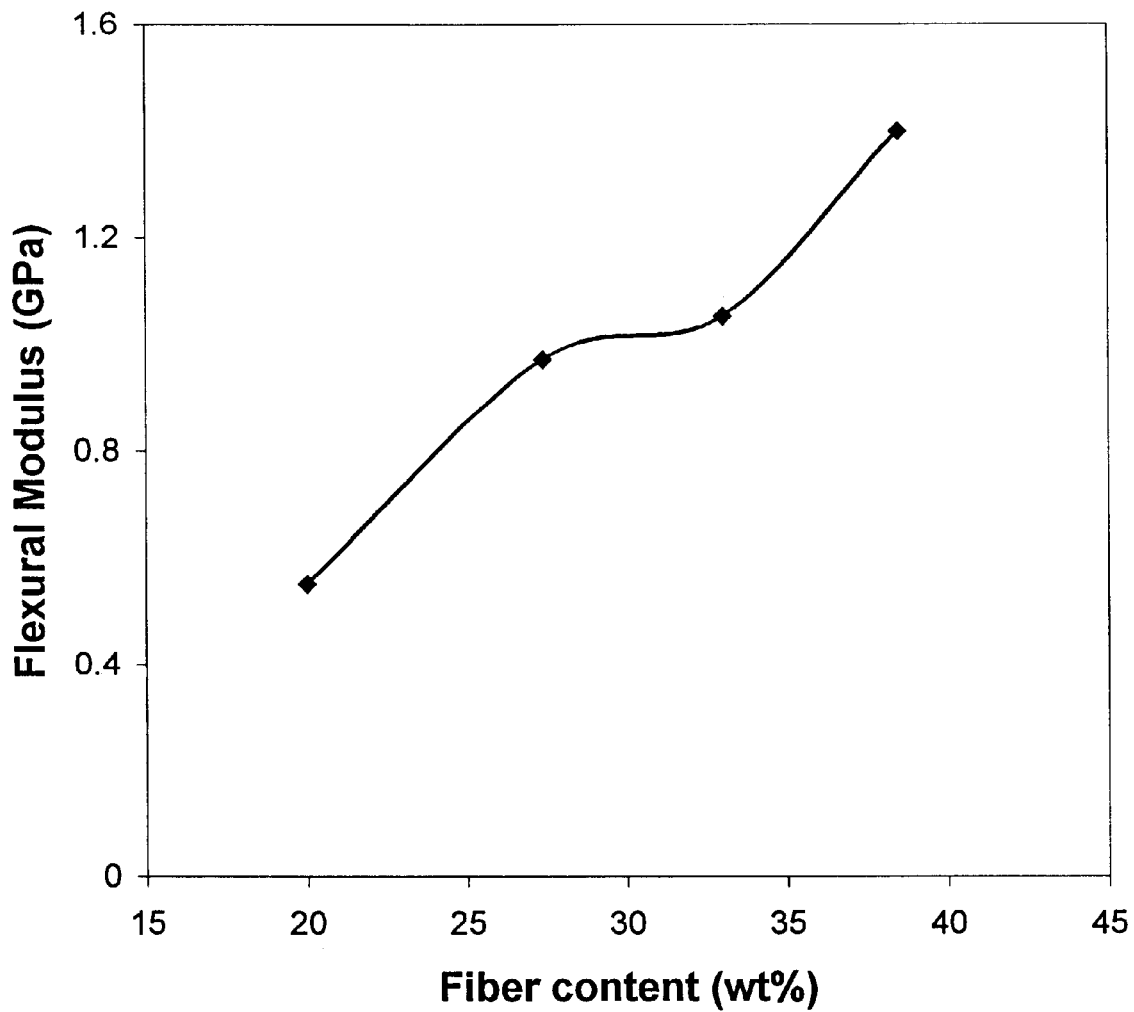
FIG. 2 is a graph showing the flexural modulus of ESO composites of the invention as a function of calcium sulfate fiber level.
Figure 3:
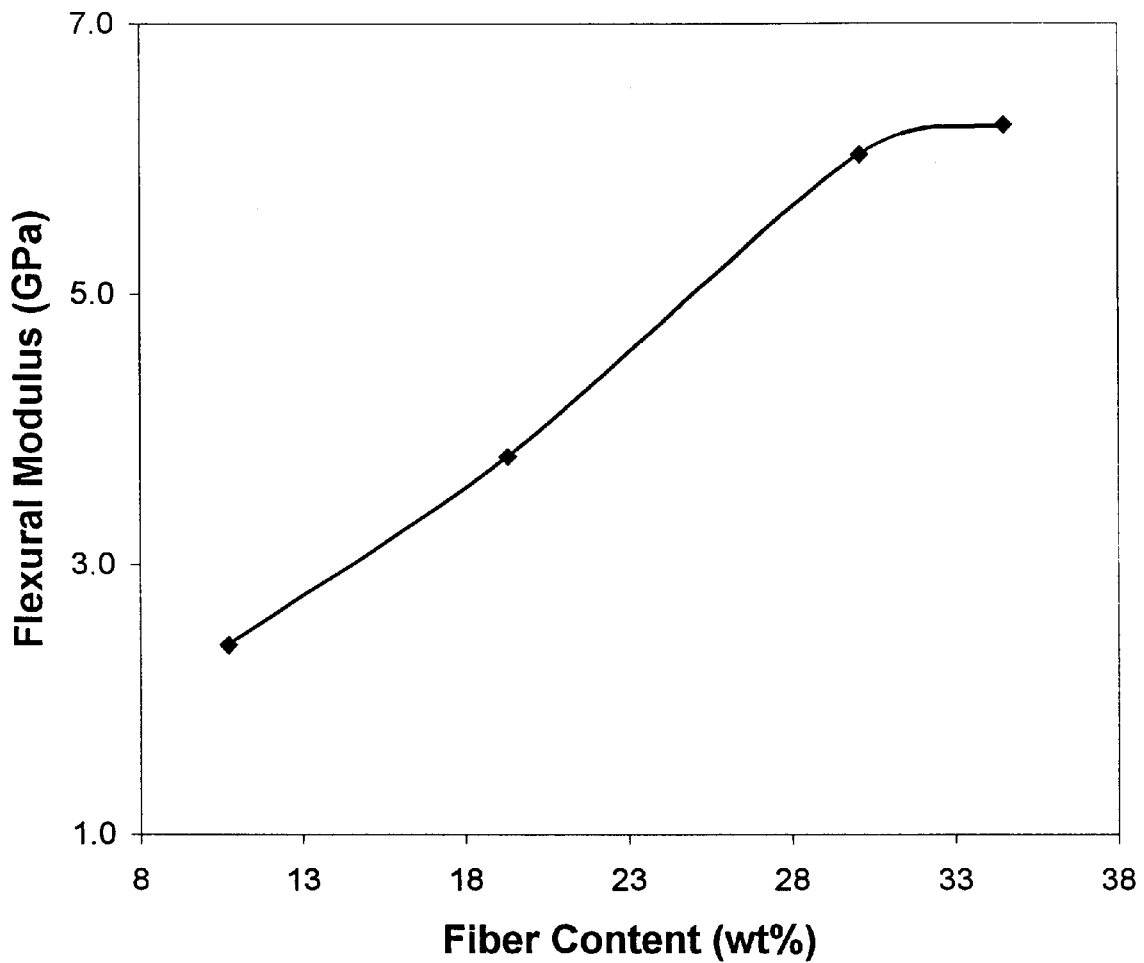
FIG. 3 is a graph showing the flexural modulus of ESO/EPON® resin composites of the invention as a function of carbon fiber level.

The level of fiber loading in the composites of this invention is a function of the inherent properties of the specific fiber being used. FIGS. 2 and 3 show the flexural modulus as a function of glass and calcium sulfate fiber contents, respectively. In FIG. 2, the flexural modulus increases with increasing calcium sulfate fiber content and levels off at contents of approximately 20% calcium sulfate fiber in the ESO composite. However, FIG. 3 shows that the flexural modulus continues to increase with increasing carbon fiber content in an ESO/EPON® resin composite at least up to a loading level of 40% by weight. In other data (Example 9), loading levels with glass fiber exceeding 60% have been obtained. It is known that maximum fiber contents are limited by the relationships given in Milewski's models, which relate to maximum volume fraction to aspect ratio [J. V. Milewski et al., *Handbook of Reinforcements for Plastics,* Van Nostrand Reinhold, New York, N.Y., (1987)]. Increasing the volume fraction beyond this limit results in a slurry which will not flow through the needle. Therefore, for glass fibers and the like, the upper limit of loading may be related more to flow properties than to flexural modulus. In most cases, the level of fiber loading would be up to about 40% by volume of the formulation, with a preferred level of about 5–30% by volume.

Thixotropic Agent Component D

The thixotropic agent is a thickener, such as a non-reinforcing silica-based material (e.g. fumed silica) or any of a variety of clays such as montmorillinite, nanoclay (alkyl quaternary ammonium montmorillinite) or the like, as well as mixtures thereof. The amount of thixotropic agent is selected to impart the desired consistency to the formulation so that it passes freely through the orifice of the freeform apparatus, yet will retain its shape after being deposited and until such time that the formulation has cured into a solid. The amount of thixotropic agent will usually be within the range of about 0.5–15% by weight of the formulation, and preferably in the range of about 1–10% by weight.

Resin Component E (Secondary Resin)

Optionally, the composite formulations of the invention include a secondary resin for the purpose of tailoring the properties of the composite for a specific end use application. The cross-linked epoxidized vegetable oils tend to yield composites having a high degree of pliability. Blending the epoxidized vegetable oil with a secondary resin that is not of drying oil origin is useful for applications requiring composites that are more rigid.

Exemplary secondary resins include bisphenol A/epichlorhydrin, bisphenol A diglycidyl ether, bisphenol F diglycidyl ether, 3,4-epoxycyclohexylmethyl-3',4'-epoxycyclohexane carboxylate, trimethylpropane triglycidyl ether, and polypropylene glycol diglycidyl ether.

Though it is contemplated to use up to about 40% by weight of the secondary resin based on the total weight of resin (epoxidized vegetable oil plus secondary resin), the advantages of the invention are best realized by limiting the secondary resin to no more than about 30% by weight of the total resin.

Composite Formulation

The components used in the preparation of the composites of the invention are combined in any manner that will produce a free-flowing bead having sufficient viscosity so as to be virtually non slumping at the point that it exits the orifice of the solid freeform fabrication apparatus.

Typically, after the epoxidized oil (A) is combined with the fibrous filler (C) and thixotropic agent (D), the mixture is degassed in order to remove any air bubbles introduced during the blending step. The degassing is preferably conducted in an oven under vacuum at about 50–60° C. for about 10–60 minutes. The mixture is then removed from the oven and cooled to a temperature within the range of about 20–30° C. or to room temperature. The curing agent (B) is then thoroughly blended into the fiber-filled epoxidized oil slurry by any means that minimizes introduction of air into the mixture. The resultant paste is loaded into the syringe of the solid freeform fabrication apparatus and is deposited, or "written", in multiple layers to shape the desired object. If the optional resin component (D) is included in the formulation, it may be desired to subject the blend to a first degassing prior to mixing with the other nonreactive components. After the fibrous filler and thixotropic agent are mixed with the resins, then the formulation is degassed a second time prior to adding the curing agent.

Insofar as the orientation of the fiber relative to the long axis of the shaped object influences the properties of the composite as indicated by the data in Table 5 below, consideration should be given to the direction of writing during the solid freeform fabrication.

Though the composite formulations described herein are ideally suited to shaping by solid freeform fabrication extrusion, it will be appreciated that articles could also be produced from these formulations by molding (e.g. injection molding), standard extrusion, and other conventional methods.

After being shaped into objects the composites are cured, usually at elevated temperatures, until cross-linking is substantially complete. The effect of curing temperature on the mechanical properties is illustrated in Table 1 below. A direct relationship is shown between the value of Young's modulus and the curing temperature. Studies by Padma et al., [*J. Appl. Chem Sci.,* 57, 401, (1995)] indicate that at lower temperatures the epoxy groups are mainly consumed by primary amine, whereas secondary amine reaction is relatively limited. At higher temperatures, both primary and secondary amine react with epoxy groups. As the reaction proceeds further, the epoxy-hydroxyl etherification reaction dominates the reaction.

In the preferred embodiments of the invention, the curing temperature is usually maintained within the range of about 90–250° C., with a preferred range of 110–190° C. and a more preferred range of 140–190° C., depending on the particular resin/curing agent system.

There is also a direct relationship between the length of time of the curing reaction and the mechanical properties. In general, the composites should be cured for a period of at least about 6 hours, and usually for a period of 24–72 hours, depending on the system. Of course, at higher temperatures the curing time can be reduced to achieve the same degree of cross-linking in a given system.

Composite Morphology

Ideally, the composites of this invention are characterized by a high degree of interfacial adhesion between the fiber and matrix. The extent of adhesion is evident from microscopic examination of the broken ends of a composite sample subjected to a tensile strength test and 3-point bend test. Where good adhesion exists, the fibers at the sample break are also broken. Where adhesion is poor, unbroken fiber are pulled out of the cross-linked matrix.

EXAMPLES

Materials

Primary resins: epoxidized soybean oil (ESO), obtained from Elf Atochem Inc. (Philadelphia, Pa.).

Secondary resin: bisphenol A/epichlorohydrin (EPON® 828), obtained from the Shell Chemical Company (Houston, Tex.).

Fibrous fillers calcium sulfate dihydrate microfiber, acicular crystal (Franklin Fiber® H-45), obtained from the United States Gypsum Company (Chicago, Ill.); average length of 60 to 75 microns; average diameter of 1.5–2 microns; average aspect ratio of 40;

surface-modified wollastonite mineral fiber (Fillex® fiber), obtained from Intercorp Inc. (Milwaukee, Wis.); average diameter of 2.5 micron and aspect ratio of 20;

milled E-glass (electric glass) fiber with a nominal length of 0.8 mm and fiber diameter of 10 $\mu$m was used; aspect ratio having two main peaks at 3 and 7;

short carbon fiber, obtained from Dupont Co. (Wilmington, Del.), and chopped in a coffee grinder for 40 seconds to yield an average length from 0.16–0.10 mm (Example 3), or for 20 seconds to yield an average length of approximately 0.25 mm. (Examples 10, 11, and 15).

Thixotropic agent: fumed silica (Aerosil® R805), obtained from Degussa Corp. (Ridgefield Park, N.J.); montmorillonite K 10, obtained from Aldrich Chemical Inc. (Milwaukee, Wis.).

Curing agents:

2,2'-(ethylenedioxy)-bisethylamine, (Jeffamine® EDR-148), polyoxypropylenediamine (Jeffamine®) D-230, and polyoxypropylenetriamine (Jeffamine® T-403), all obtained from Huntsman Corporation (Houston, Tex.);

diethylenetriamine (DTA) and triethylenetetramine (TTA), both obtained from Aldrich Chemical Inc. (Milwaukee, Wis.).

General Procedure A for Composite Formation with ESO Resin.

Epoxidized soybean oil (ESO) was mixed with fumed silica thixotropic agent (13 g/100 g ESO) and each of the fibrous fillers. The mixture was degassed in a vacuum system at 55° C. for 30 minutes. The fiber-filled slurries showed a yield point such that formed parts hold their shape until cured. The mixture was removed from the oven and cooled to room temperature. Curing agent 37 g/100 g (ESO) was blended into the cooled mixture and the resultant paste was loaded into the 20 cc plastic syringe of a solid freeform fabrication apparatus, an Asymtek® Model 402 fluid dispensing system, equipped with small stepper motors to drive the delivery syringe. Solid bar samples were written as a series of lines. Bars 75 mm×8 mm×4 mm were formed by deposition of five layers and subsequently were cured at 100° C. for 24 hours (first stage), then for 130–160° C. for 48 hours (second stage).

General Procedure B for Composite Formation with ESO Resin and EPON® 828 Resin

Epoxidized soybean oil (ESO) and EPON® 828 were thoroughly blended in the ratio of 1:0.3. Vacuum was applied at 55° C. for 30 minutes to remove air bubbles. The degassed resin blend was then mixed with fumed silica thixotropic agent (10 g/100 g ESO+EPON® 828) and each of the fibrous fillers. The mixture was again degassed in a vacuum system at 55° C. for 30 minutes. The fiber-filled slurries showed a yield point such that formed parts hold their shape until cured. The mixture was removed from the oven and cooled to room temperature. Curing agent 23.3 g/100 g (ESO+EPON® 828) was blended into the cooled mixture, and the resultant paste was loaded into the 20 cc plastic syringe of a solid freeform fabrication apparatus, an Asymtek® Model 402 fluid dispensing system, equipped with small stepper motors to drive the delivery syringe. Solid bar samples were written as a series of lines. Bars 75 mm×8 mm×4 mm were formed by deposition of five layers and subsequently were cured at 100° C. for 24 hours (first stage), then for 150–190° C. for 48 hours (second stage).

Tensile Tests

The nonlinear mechanical behavior of the ESO-based composite bars was analyzed using an Instron® Model IX automated materials testing system in tensile mode, with a load cell of 1000 N capacity. The crosshead speed was 50 mm/min. Tensile tests were performed at 25° C., Young's modulus (E) was measured from the low strain region. The values reported in Tables 1–5 below, are the average of five measurements.

The mechanical properties of the ESO/EPON® 828-based composite bars were analyzed using a 3-point bend test method with an Instron® Model 1100. The standard formulae for the modulus, E, and strength, a, in 3-pt bending of a beam were used:

$$E = PL^3 / 4bd^3 \delta$$

$$\sigma = 3PL / 2bd^2$$

where P is equal to the break load, L is the support span, $\delta$ is the deformation at the center under load P, d is the sample height, and b is the sample width.

Scanning Electron Microscopy

Scanning electron microscopy (SEM) was performed to investigate the morphologies of the fibrous fillers (given above), and the interface between the filler and the polymeric matrix. The specimens were mounted on aluminum stubs with graphite-filled tape and vacuum-coated with gold-palladium on a JEOL ion sputter coater, and observed. SEM micrographs were obtained using 5 kv secondary electrons.

Dynamic Mechanical Analysis

Dynamic mechanical tests were carried out with a Perkin Elmer DMA 7 spectrometer in the three-point bending mode. The tests were performed at 1.0 Hz of frequency and the temperature was varied between –60° C. and 60° C. in 5° C. increments. The specimen was a thin rectangular strip with dimensions of 15×3.5×2 mm.

Example 1

ESO Resin; Effect of Curing Temperature

Composites were made by the General Procedure A described above, using ESO (56 wt %), calcium sulfate fiber (15.6 wt %), Jeffamine® EDR-148 curing agent (37 g/100 g ESO), and fumed silica (13 g/100 g ESO). Effect of second stage curing temperature on the mechanical properties is presented in Table 1. Young's modulus is shown to increase as the curing temperature increases. This is the result of a higher reaction rate of the secondary amines, and increased cross-linking.

Example 2

ESO; Effect of Curing Agent

Composites were made by the general procedure A described above, using ESO (52 wt %), calcium sulfate fiber (22 wt %), various curing agents (37 g/100 g ESO), and fumed silica (13 g/100 g ESO). Second stage curing temperature was 150° C.. Effect of the specific curing agent on the mechanical properties is presented in Table 2. As can be seen, the reactive order is TTA>DTA>EDR-148>T-403>D230.

Example 3

ESO; Effect of Fiber Type

Composites were made by the General Procedure A described above, using ESO, various fibers (12 vol %), Jeffamine® EDR-148 curing agents (37 g/100 g ESO), and fumed silica (13 g/100 g ESO). Second stage curing temperature was 150° C. Effect of the specific fibrous filler on the tensile properties is presented in Table 3. It can be seen that among different fiber types, glass fiber and carbon fiber show better reinforcing effects than the mineral fibers, calcium sulfate and wollastonite. The summary of flexural moduli at –60° C. and glass transition temperatures for composites filled with the four different fibers are presented in Table 4. The modulus of bend specimen with glass fiber is larger than carbon fiber, wollastonite and calcium sulfate fiber. However, the glass transition temperatures, $T_g$, for composites filled with the four kinds of fibers are almost identical, approximately –18° C. A typical curve of flexural modulus vs. temperature is displayed in FIG. 1 for E-glass filled composite.

Example 4

ESO; Influence of Fiber Orientation on Tensile Properties

Composites were made by the General Procedure A described above, using ESO (56 wt %), calcium sulfate fiber (15.6 wt %), Jeffamine® EDR-148 curing agent (37 g/100 g ESO), and fumed silica (13 g/100 g ESO). Second stage curing temperature was 150° C. Test bars were made by writing at varying angles relative to the axis of the test bars. The effect of this orientation on elastic modulus is shown in Table 5. Strength, as well as stiffness, follows the direction of the reinforcement. It can be seen that modulus is much higher parallel to the writing direction than cross-wise to this direction.

Example 5
ESO; Effect of Fiber Loading

Composites were made by the general procedure A described above, using ESO, various levels of calcium sulfate fiber, Jeffamine® EDR-148 curing agent (37 g/100 g ESO), and fumed silica (13 g/100 g ESO). Second stage curing temperature was 150° C. It can be seen from FIG. 2 that the increase in fiber content leads to an increase in the tensile modulus at least up to 23 wt %, which subsequently levels off at loadings beyond this point.

Example 6
ESO/EPON® 828 Resin/Jeffamine® EDR-148; Effect of Curing Temperature Composites were made by the General Procedure B described above, using ESO (47.6 wt %), EPON® 828 (14.5 wt %), calcium sulfate (23.4 wt %), Jeffamine® EDR-148 (23.3 g/100 g ESO+EPON® 828) and fumed silica (10.0 g/100 g ESO+EPON® 828). Effect of temperature on the mechanical properties is presented in Table 6. As can be seen, the flexural modulus increases as curing temperature increases. This was the same trend obtained with neat ESO reported in Example 1, presumably as a result of secondary amines entering into the reaction at the higher temperatures.

Example 7
ESO/EPON® 828 Resin/TTA; Effect of Curing Temperature

The procedure of Example 6 was repeated except that TTA was substituted for the Jeffamine® EDR-148. Component proportions were as follows: ESO (52.0 wt %), EPON® 828 (15.8 wt %), calcium sulfate (25.5 wt %), TTA (23.3 g/100 g ESO+EPON® 828) and fumed silica (10.0 g/100 g ESO+EPON® 828). Effect of temperature on the mechanical properties is presented in Table 7. As can be seen, the flexural modulus increases as curing temperature increases. This was the same trend obtained in Example 6, presumably as a result of secondary amines entering into the reaction at the higher temperatures.

Example 8
ESO/EPON® 828 Resin; Effect of Curing Agent

Composites were made by the General Procedure B described above, using ESO (52.0 wt %), EPON® 828 (15.8 wt %), calcium sulfate (25.5 wt %), fumed silica (10.0 g/100 g ESO+EPON® 828) and various curing agents (23.3 g/100 g ESO+EPON® 828). Second stage curing temperature was 150° C. for polyethylenimine, TTA and DTA, and 180° C. for all Jeffamine® agents. Flexural strength and flexural modulus data for these composites is reported in Table 8. The same order of curing agent reactivity observed for neat ESO was also observed for the ESO/EPON® 828; that is TTA>DTA>polyethyleneimine>EDR-148>T-403>D230. It is presumed that the primary amine and secondary amine groups in small molecules of DTA and TTA are more easily accessible, and therefore have higher reactivity, than those in polyethylenimine.

Example 9
ESO/EPON® 828 Resin; Effect of Curing Time at 150° C.

Composites were made by the general procedure B described above, using ESO (26.7 wt %), EPON® 828 (8.1 wt %), E-glass fiber (62 wt %), fumed silica (10.0 g/100 g ESO+EPON® 828) and TTA curing agent (23.3 g/100 g ESO+EPON® 828). The second stage curing was conducted at 150° C. for periods ranging from 9–48 hours. The results reported in Table 9 indicate that the flexural modulus increases as curing time increases, presumably as a result of the secondary amine taking part in the cross-linking reaction.

Example 10
ESO/EPON® 828 Resin/Jeffamine® EDR-148; Effect of Fiber Type

Composites were made by the General Procedure B described above, using ESO (52.0 vol %), EPON® 828 (13.5 vol %), various fibers (18.7 vol %), fumed silica (10 g/100 g ESO+EPON® 828) and Jeffamine® EDR-148 curing agent (23.3 g/100 g ESO+EPON® 828). Second stage curing temperature was 180° C. Effect of four types of fibers on the mechanical properties of the composites is presented in Table 10. The glass and carbon fibers show better reinforcing effects than the mineral fibers.

Example 11
ESO/EPON® 828 Resin/TTA; Effect of Fiber Type

The procedure of Example 10 was repeated except that TTA was substituted for the Jeffamine® EDR-148. Component proportions were as follows: ESO (52.7 vol %), EPON® 828 (13.7 vol %), fiber (17.1 vol %), TTA (23.3 g/100 g ESO+EPON® 828) and fumed silica (10.0 g/100 g ESO+EPON® 828). Second stage curing was at 150° C. for 48 hours. Effect of four types of fibers on the mechanical properties of the composites is presented in Table 11. The glass and carbon fibers show better reinforcing effects than the mineral fibers.

Example 12
ESO/EPON® 828 Resin; Effect of Fiber Orientation

Composites were made by the General Procedure B described above, using ESO (47.6 wt %), EPON® 828 (14.5 wt %), calcium sulfate fiber (23.4 wt %), fumed silica (10 g/100 g ESO+EPON® 828) and Jeffamine® EDR-148 curing agent (23.3 g/100 g ESO+EPON® 828). Second stage curing temperature was 180° C. Test bars were made by writing at varying angles relative to the axis of the test bars. The effect of this orientation on flexural modulus is shown in Table 12. The modulus values at writing angles parallel to the long axis are approximately three times those at writing angles cross-wise to the long axis. These results demonstrate that the composite modulus is at least as sensitive to orientation as to fiber aspect ratio and volume fraction.

Example 13
ESO/EPON® 828 Resin; Effect of EPON® 828/ESO Ratio

Composites were made by the General Procedure B described above, using calcium sulfate fiber (23.4 wt %), Jeffamine® EDR-148 curing agent (23.3 g/100 g ESO+EPON® 828), fumed silica (10.0 g/100 g ESO+EPON® 828) and various ratios of EPON® 828 to ESO. Second stage curing temperature was 180° C. As can be seen in Table 13, flexural modulus increases as the amount of EPON® 828 increases. In this two component matrix system, ESO is a soft segment, and EPON® 828 epoxy is a hard segment. An increase in EPON® 828 provides the composite with a higher flexural modulus. However, when the EPON® 828/ESO weight ratio was more than 0.3 to 1 in this system, phase separation was observed.

Example 14
ESO/EPON® 828 Resin/Jeffamine® EDR-148; Effect of Fiber Loading

Composites were made by the General Procedure B described above, using EPON®/ESO in the ratio of 0.3:1, fumed silica (10.0 g/100 g ESO+EPON® 828), Jeffamine® EDR-148 curing agent (23.3 g/100 g ESO+EPON® 828) and various ratios of carbon fiber in the range of 20–40 wt %. Second stage curing was at 180° C. for 48 hours. The effect of fiber content on flexural modulus is presented in FIG. 3, which shows that an increase in fiber content leads to an increase in the flexural modulus.

Example 15
ESO/EPON® 828 Resin/TTA or TDA; Effect of Fiber Combination

Composites were made by the general procedure B described above, using ESO (30.0 wt %), EPON® 828 (9.0 wt %), either E-glass fiber (36.8 vol %) or carbon fiber (36.8 vol %) alone, or at a rate of 32 vol % in combination with calcium sulfate (4.8 vol %), TTA (23.3 g/100 g ESO+EPON® 828) and fumed silica (10.0 g/100 g ESO+EPON® 828). Second stage curing was at 150° C. for 48 hours. The results shown in Table 14 indicate that the moduli of the composites increase compared to single type fiber-epoxy composites under the same conditions.

Example 16
ESO/EPON® 828 Resin/TTA; Effect of Thixotropic Agent Type

Composites were made by the general procedure B described above, using ESO (41 wt %), EPON® 828 (12.5 wt %), calcium sulfate fiber (20.2 wt %), TTA (23.3 g/100 g ESO+EPON® 828) and montmorillinite clay (49.0 g/100 g ESO+EPON® 828). Second stage curing temperature was at 150° C. for 48 hours. The results shown in Table 15 indicate that the moduli of the composites increase compared to single type fiber-epoxy composites under the same conditions.

It is understood that the foregoing detailed description is given merely by way of illustration and that modification and variations may be made therein without departing from the spirit and scope of the invention.

All references cited above are incorporated herein by reference.

TABLE 1

ESO - Effect of Curing Temperature on Tensile Properties

| Temperature ° C. | Tensile Strength (MPa) | Tensile Modulus (MPa) |
|---|---|---|
| 130 | 0.72 | 2.18 |
| 140 | 1.02 | 4.30 |
| 150 | 1.52 | 7.20 |
| 160 | 1.40 | 8.81 |

TABLE 2

ESO - Effect of Curing Agent on Tensile Properties

| Curing Agent | Tensile Strength (MPa) | Tensile Modulus (MPa) | Epoxy/Amine H |
|---|---|---|---|
| Jeffamine ® D230 | 0.11 | 1.01 | 1:1.47 |
| Jeffamine ® T403 | 1.25 | 7.5 | 1:1.26 |
| Jeffamine ® EDR 148 | 1.43 | 8.00 | 1:2.28 |
| DTA | 6.29 | 231.39 | 1:4.10 |
| TTA | 8.29 | 301.60 | 1:2.10 |

TABLE 3

ESO - Effect of Fiber Type on Tensile Properties

| Fiber | Tensile Strength (MPa) | Tensile Modulus (MPa) |
|---|---|---|
| E-glass | 1.50 | 12.2 |
| Carbon | 1.45 | 9.3 |
| Calcium Sulfate | 1.43 | 9.1 |
| Wollastonite | 1.30 | 9.0 |

TABLE 4

ESO - Effect of Fiber Type on Dynamic Mechanical Properties

| Fiber | Flexural Modulus (MPa) | Tg (° C.) |
|---|---|---|
| E-glass | 1500 | −20 |
| Carbon | 120 | −17 |
| Wollastonite | 55 | −18 |
| Calcium Sulfate | 24 | −16 |

TABLE 5

ESO - Influence of Fiber Orientation on Tensile Properties

| Angle of Write Axis to Tension, Degrees | Tensile Strength (MPa) | Tensile Modulus (MPa) |
|---|---|---|
| 0 | 1.51 | 7.20 |
| 30 | 1.49 | 7.05 |
| 45 | 1.27 | 4.71 |
| 60 | 0.89 | 4.26 |

TABLE 6

ESO/EPON ® - Effect of Curing Temperature for Jeffamine ® EDR-148 on Physical Mechanical Properties

| Curing Temperature ° C. | Flexural Modulus GPa | Flexural Strength MPa | Strain at Break, % |
|---|---|---|---|
| 160 | 0.13 | 13.0 | 4.3 |
| 170 | 0.35 | 13.7 | 3.4 |
| 180 | 0.97 | 21.0 | 2.2 |
| 190 | 0.98 | 23.0 | 2.4 |

TABLE 7

ESO/EPON ® - Effect of Curing Temperature for TTA on Physical Mechanical Properties

| Curing Temperature ° C. | Flexural Strength GPa | Flexural Modulus MPa | Strain at Break, % |
|---|---|---|---|
| 110 | 85.0 | 2.50 | 4.0 |
| 120 | 100.0 | 3.90 | 4.4 |
| 130 | 109.0 | 3.95 | 5.1 |
| 150 | 110.0 | 4.00 | 2.1 |

TABLE 8

ESO/EPON ® - Effect of Curing Agents on Physical Mechanical Properties

| Curing Agent | Flexural Strength MPa | Flexural Modulus GPa | Strain at Break % | Epoxy/Amine H |
|---|---|---|---|---|
| Jeffamine ® D-230 | 10.5 | 0.27 | 3.78 | 1:1.20 |
| Jeffamine ® T-403 | 14.2 | 0.25 | 5.95 | 1:1.02 |
| Jeffamine ® EDR-148 | 21.0 | 0.97 | 2.22 | 1:1.85 |
| Polyethylenimine (linear) | 25.0 | 1.5 | 2.30 | 1:1.75 |
| DTA | 65.0 | 3.93 | 1.54 | 1:3.30 |
| TTA | 110.0 | 4.00 | 2.11 | 1:1.69 |

TABLE 9

ESO/EPON ® - Effect of Curing Time on Physical Mechanical Properties

| Curing Time (hr) | Flexural Strength MPa | Flexural Modulus GPa | Strain at Break % |
|---|---|---|---|
| 9 | 80 | 3.5 | 3.5 |
| 17 | 81 | 4.6 | 3.2 |
| 27 | 95 | 4.7 | 2.3 |
| 39 | 110 | 5.5 | 2.5 |
| 48 | 120 | 6.8 | 1.5 |

TABLE 10

ESO/EPON ® - Effect of Fiber Type (Jeffamine ® EDR-148 Curing Agent) on Physical Mechanical Properties

| Fiber | Flexural Modulus GPa | Flexural Strength MPa | Strain at Break % |
|---|---|---|---|
| E-glass | 1.28 | 22.3 | 3.2 |
| Carbon | 1.06 | 21.0 | 6.6 |
| Calcium Sulfate | 0.97 | 21.0 | 2.2 |
| Wollastonite | 0.77 | 19.5 | 4.2 |

TABLE 11

ESO/EPON ® - Effect of Fiber Type (TTA Curing Agent) on Physical Mechanical Properties

| Fiber | Flexural Modulus GPa | Flexural Strength MPa | Strain at Break % |
|---|---|---|---|
| E-glass | 120.0 | 6.7 | 1.91 |
| Carbon | 63.0 | 3.6 | 2.42 |
| Calcium Sulfate | 54.5 | 3.4 | 2.11 |
| Wollastonite | 44.5 | 2.8 | 2.43 |

TABLE 12

ESO/EPON ® - Effect of Fiber Orientation on Physical Mechanical Properties

| Fiber Orientation | Flexural Modulus GPa | Flexural Strength Mpa | Strain at Break, % |
|---|---|---|---|
| 0 | 0.97 | 21.0 | 2.2 |
| 30 | 0.42 | 14.0 | 5.0 |
| 45 | 0.34 | 16.0 | 5.0 |
| 60 | 0.32 | 22.0 | 4.3 |
| 90 | 0.29 | 8.1 | 2.2 |

TABLE 13

Effect of EPON 828/ESO Ratio

| EPON/ESO Ratio (weight) | Flexural Modulus GPa | Flexural Strength MPa | Strain at Break, % |
|---|---|---|---|
| 0.30:1 | 0.97 | 21.0 | 2.2 |
| 0.22:1 | 0.71 | 16.3 | 3.3 |
| 0.15:1 | 0.26 | 12.1 | 3.6 |

TABLE 14

ESO/EPON ® - Effect of Fiber Combination on Physical Properties

| Curing Agent | Fiber 1 | Fiber 2 | Flexural Strength MPa | Flexural Modulus GPa | Strain at Break % |
|---|---|---|---|---|---|
| TTA | Glass Fiber | Franklin Fiber | 110.0 | 6.3 | 1.9 |
| TTA | Carbon Fiber | Franklin Fiber | 96.3 | 5.48 | 2.1 |
| TTA | Glass Fiber | **** | 69.0 | 4.1 | 1.8 |
| TTA | Carbon Fiber | **** | 63.0 | 3.6 | 2.4 |
| DTA | Glass Fiber | Franklin Fiber | 104.3 | 5.5 | 2.3 |
| DTA | Carbon Fiber | Franklin Fiber | 86.0 | 4.7 | 2.6 |

TABLE 15

ESO/EPON ® - Montmorillonite K 10 as Thixotropic Agent

| Thixotropic Agent | Flexural Strength MPa | Flexural Modulus GPa | Strain at Break % |
|---|---|---|---|
| Montmorillonite K10 | 70.5 | 4.5 | 1.4 |

We claim:

1. A composite formulation useful for solid freeform fabrication, comprising an admixture of:
   a. an epoxidized drying oil;
   b. a polyamine curing agent;
   c. a fibrous filler; and
   d. a thixotropic agent.

2. The composite formulation of claim 1, wherein said drying oil is a vegetable oil.

3. The composite formulation of claim 2, wherein said vegetable oil is selected from the group consisting of castor oil, linseed oil, oiticica oil, safflower oil, soybean oil, sunflower oil, corn oil and tung oil.

4. The composite formulation of claim 3, wherein said vegetable oil is soybean oil.

5. The composite formulation of claim 1, wherein said polyamine is selected from the group consisting of polyether polyamines and aliphatic polymamines.

6. The composite formulation of claim 5, wherein said polyamine is a polyether polyamine.

7. The composite formulation of claim 5, wherein said polyamine is an aliphatic polymamine.

8. The composite formulation of claim 5, wherein said polyamine is selected from the group consisting of 2,2'-(ethylenedioxy)-bisethylamine, polyoxypropylene diamine, polyoxypropylene triamine, diethylenetriamine and triethylenetetramine.

9. The composite formulation of claim 1, wherein said fibrous filler is a mineral fiber selected from the group consisting of glass, carbon, silica, silicon carbide, boron carbide, surface modified wollastonite, and calcium sulfate dihydrate.

10. The composite formulation of claim 1, further comprising:
    e. a secondary resin.

11. The composite formulation of claim 10, wherein said secondary resin is bisphenol A/epichlorhydrin.

12. A composite useful for solid freeform fabrication, comprising an admixture of:
    a. an epoxidized drying oil cross-linked with a polyamine curing agent;
    b. a fibrous filler; and
    c. a thixotropic agent.

13. The composite of claim 12, wherein said drying oil is a vegetable oil.

14. The composite of claim 13, wherein said vegetable oil is selected from the group consisting of castor oil, linseed oil, oiticica oil, safflower oil, soybean oil, sunflower oil, corn oil and tung oil.

15. The composite of claim 14, wherein said vegetable oil is soybean oil.

16. The composite of claim 12, wherein said polyamine is selected from the group consisting of polyether polyamines and aliphatic polymamines.

17. The composite of claim 16, wherein said polyamine is a polyether polyamine.

18. The composite of claim 16, wherein said polyamine is an aliphatic polymamine.

19. The composite of claim 16, wherein said polyamine is selected from the group consisting of 2,2'-(ethylenedioxy)-bisethylamine, polyoxypropylene diamine, polyoxypropylene triamine, diethylenetriamine and triethylenetetramine.

20. The composite of claim 12, wherein said fibrous filler is a mineral fiber selected from the group consisting of glass, carbon, silica, silicon carbide, boron carbide, surface modified wollastonite, and calcium sulfate dihydrate.

21. The composite of claim 12, further comprising:
   e. a secondary resin.

22. The composite of claim 21, wherein said secondary resin is bisphenol A/epichlorhydrin.

23. A method of forming an article by solid freeform fabrication extrusion, comprising the steps:
   a. providing a mixture of an epoxidized drying oil, a fibrous filler, and a thixotropic agent;
   b. combining said mixture with a polyamine curing agent; and
   c. shaping said mixture into an article using a solid freeform fabrication extrusion apparatus.

* * * * *